United States Patent Office 3,294,261
Patented Dec. 27, 1966

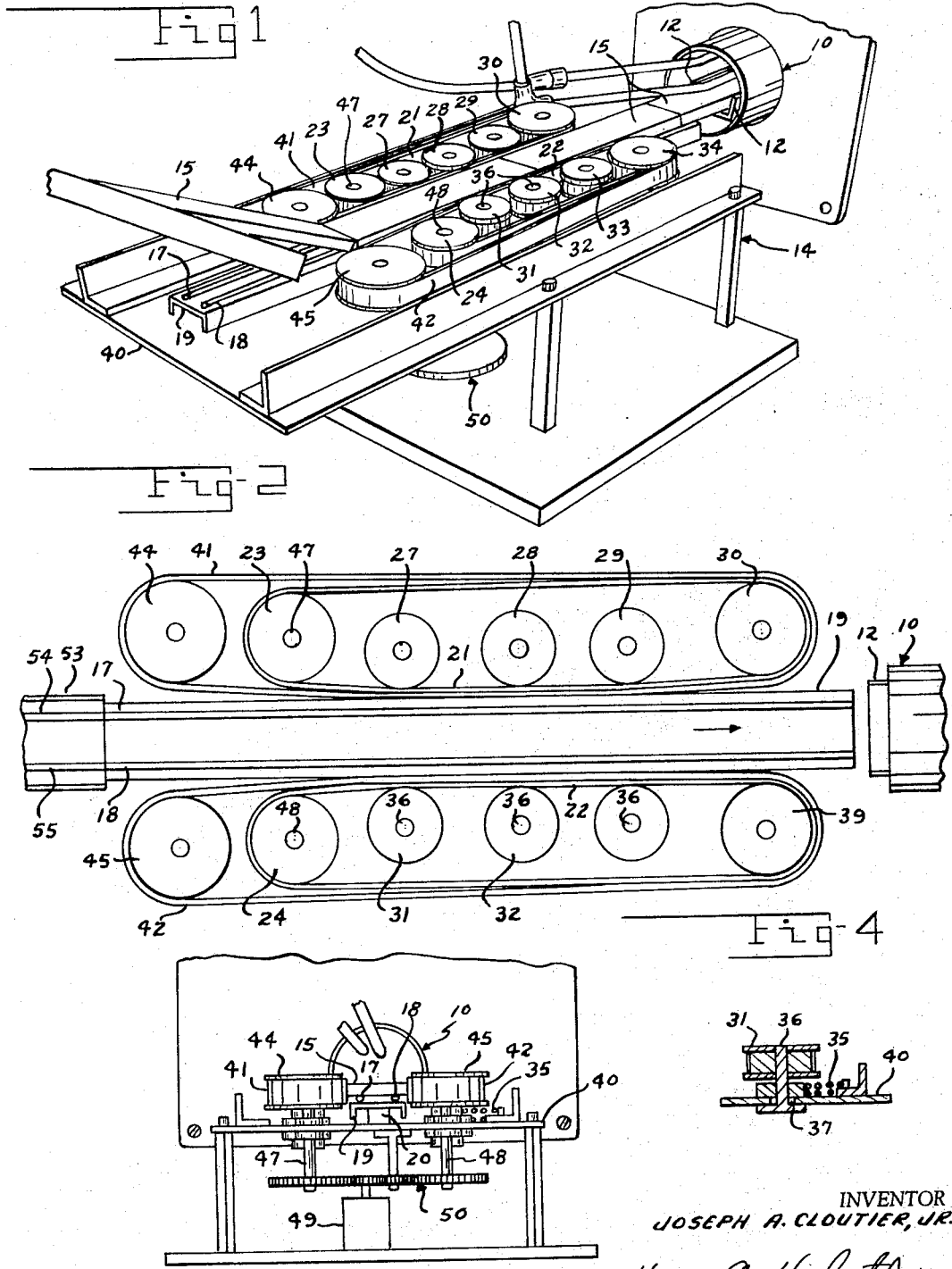

3,294,261
CONTINUOUS DRIVE FEED FOR OXIDATION-DIFFUSION FURNACE
Joseph A. Cloutier, Jr., Rte. 3, Box 272C,
Arnold, Md. 21012
Filed June 30, 1965, Ser. No. 468,653
3 Claims. (Cl. 214—18)

This invention relates to a continuous drive mechanism for feeding wafer carriers into an oxidation-diffusion furnace.

One object of the invention is to provide a device for moving quartz wafer carriers through a continuous oxidation-diffusion furnace which keeps the quartz wafer carriers from sticking to the quartz furnace channel.

Another object of the invention is to provide a device for moving wafer carriers through a continuous oxidation-diffusion furnace which avoids contaminating the carriers in the operation.

These and other objects will be more fully understood from the following detailed description taken with the drawing, wherein:

FIG. 1 is a perspective view of the continuous drive mechanism of the invention;

FIG. 2 is a top schematic view of the continuous drive mechanism of FIG. 1;

FIG. 3 is a left-end view of the continuous drive mechanism of FIG. 1; and

FIG. 4 is a sectional view of one of the pressure rollers of the device of FIG. 1 showing the spring loading.

When plunger type drives are used to move the quartz wafer carriers through the quartz furnace tube in an oxidation-diffusion furnace, such as in the treatment of silicon dendrite wafers, the forward motion of the carriers is interrupted as the plunger returns to engage another carrier, which permits sticking of the quartz carriers to the quartz tube or channel in the furnace.

The use of a conveyor type belt passing through the furnace, for moving the wafer carriers through the furnace, is not practical because of the difficulty of flushing contaminating atmospheres out of the weave and linkage of the belt.

According to this invention, a friction drive mechanism is mounted externally to the furnace to drive the carriers through the furnace. The quartz carriers are moved through the furnace by two rubber belts that are urged toward the sides of the carriers by spring-loaded pulleys. Stainless steel belts are provided between the rubber belts and the quartz carriers to prevent contamination of the carriers by the rubber belts.

Reference is now made to FIG. 1 of the drawing which shows an oxidation-diffusion furnace 10 having a quartz guide channel 12. A continuous drive mechanism 14 is aligned with the entrance of furnace 10 to continuously supply quartz wafer carriers, shown schematically at 15, to the furnace 10. The carriers 15 are supported upon two quartz rods 17 and 18 which, in turn, are supported by an inverted channel 19 on channel support 20, shown in FIG. 3. A pair of continuous rubber belts 21 and 22 are supported adjacent the quartz rods 17 and 18 by means of drive pulleys 23 and 24, and idler pulleys 27, 28, 29, 30 and 31, 32, 33, 34, respectively.

The pulleys 31, 32, 33 are urged toward the wafer carriers by means of springs such as 35 as shown in FIG. 4. The pulley support shafts 36 are free to move in slots 37, one of which is shown, in support platform 40. A pair of stainless steel belts 41 and 42 surround the belts 21 and 22, respectively, and are supported by idler pulleys 30, 44 and 34, 45, respectively. Belt 41 is in contact with belt 21 adjacent pulleys 27, 28, 29 and 30 and is thus driven by belt 21. Belt 42 is in contact with belt 22 adjacent pulleys 31, 32, 33 and 34 and is thus driven by belt 22. The shafts 47 and 48 of pulleys 23 and 24 are driven by a motor 49 through gear train 50. The wafer carriers 15 are supplied to the drive mechanism through a supply chute 53. The chute 53 also has quartz support rods 54 and 55. However, the particular means used to supply the wafer carriers to the drive mechanism forms no part of the invention and it is obvious that other means could be used.

In the operation of the device of the invention, the motor 49 drives pulleys 23 and 24 which, in turn, drive belts 21 and 22 in the direction shown by the arrow in FIG. 2. The stainless steel belts 41 and 42 are in turn driven by belts 21 and 22. The wafer carriers 15 are supplied to the drive mechanism by the chute 53. The spring-loaded pulleys 31, 32 and 33 press against the belt 22 and belt 42 and cause the wafer carriers 15 to be gripped between belts 41 and 42. The continuous movement of the belts 41 and 42 provides a continuous supply of wafer carriers to the furnace 10. The continuous drive mechanism 14 keeps the wafer carriers 15 moving through the furnace 10 and thus prevents sticking of the carriers to the channel 12 within the furnace. The stainless steel belt prevents contamination of the wafer carriers.

There is thus provided a continuous drive mechanism for feeding wafer carriers into an oxidation-diffusion furnace.

While a certain specific embodiment has been described, it is obvious that numerous changes may be made without departing from the general principles and scope of the invention.

I claim:

1. In combination with a continuous oxidation-diffusion furnace, with a channel therein for receiving quartz carriers for semiconductor wafers, whereby the semiconductor wafers may be processed in said furnace; a continuous drive mechanism having a first pair of continuous conveyor belts with their driving surfaces located in juxtaposed parallel relation; means for driving the adjacent surfaces of said belts in the direction toward said furnace; a second pair of conveyor belts of stainless steel with each of said second belts surrounding one of said first belts; means for urging the adjacent surfaces of said belts toward each other; whereby said wafer carriers may be gripped therebetween; a plurality of quartz rods; means for supporting said quartz rods between and below the adjacent surfaces of said conveyor belts in line with the bottom of the wafer carrier support channel of said furnace and belt pulley roller means supporting each of said belts.

2. In combination with a continuous oxidation-diffusion furnace, with a channel therein for receiving quartz carriers for semiconductor wafers, whereby the semiconductor wafers may be processed in said furnace; a continuous drive mechanism having a first pair of continuous conveyor belts with their driving surfaces located in juxtaposed parallel relation; means for driving the adjacent surfaces of said belts in the same direction toward said furnace; a second pair of conveyor belts of stainless steel with each of said second belts surrounding one of said first belts; a plurality of pressure rollers contacting the inner surface of said first pair of belts adjacent their driving surfaces; spring means attached to the pressure rollers adjacent one of said first pair of belts for urging said belt toward the other of said first pair of belts whereby said wafer carriers may be gripped between said stainless steel belts; a pair of quartz rods; means for supporting said quartz rods between and below the adjacent surfaces of said conveyor belts located in line with the bottom of the wafer carrier support channel of said furnace and belt pulley roller means supporting each of said belts.

3. A continuous drive mechanism for feeding quartz wafer carriers into a continuous oxidation-diffusion furnace, comprising: a first pair of continuous conveyor belts having their driving surfaces located in juxtaposed parallel relation; means for driving the adjacent surfaces of said belts in the same direction; a second pair of conveyor belts of stainless steel with each of said second belts surrounding one of said first belts; means for urging the adjacent surfaces of said belts toward each other, whereby said wafer carriers may be gripped between said stainless steel belts; a plurality of quartz rods; means for supporting said quartz rods between and below the adjacent surfaces of said conveyor belts with the quartz rods adapted to be located in line with the bottom of the wafer carrier support channel of said furnace and belt pulley roller means supporting each of said belts.

References Cited by the Examiner

UNITED STATES PATENTS 3,202,406  8/1965  Tack _____ 263—6 X

GERALD M. FORLENZA, *Primary Examiner.*

R. G. SHERIDAN, *Assistant Examiner.*